US008347105B2

(12) United States Patent
Joffray (10) Patent No.: US 8,347,105 B2
(45) Date of Patent: Jan. 1, 2013

(54) METHOD AND SYSTEM FOR OBTAINING A PIN VALIDATION SIGNAL IN A DATA PROCESSING UNIT

(75) Inventor: Olivier Joffray, Feucherolles (FR)

(73) Assignee: Gemalto SA, Meudon (FR)

( * ) Notice: Subject to any disclaimer, the term of this patent is extended or adjusted under 35 U.S.C. 154(b) by 234 days.

(21) Appl. No.: 12/678,621

(22) PCT Filed: Sep. 16, 2008

(86) PCT No.: PCT/EP2008/062311
§ 371 (c)(1),
(2), (4) Date: Mar. 17, 2010

(87) PCT Pub. No.: WO2009/037259
PCT Pub. Date: Mar. 26, 2009

(65) Prior Publication Data
US 2010/0262835 A1    Oct. 14, 2010

(30) Foreign Application Priority Data
Sep. 18, 2007    (EP) ...................................... 07291110

(51) Int. Cl.
*G06F 21/00*    (2006.01)
(52) U.S. Cl. ........................................................ 713/185
(58) Field of Classification Search .................. 713/172, 713/184, 185, 165, 167; 726/6, 7, 9, 18–20
See application file for complete search history.

(56) References Cited

U.S. PATENT DOCUMENTS

| | | | |
|---|---|---|---|
| 5,517,569 A | 5/1996 | Clark | |
| 5,920,730 A | 7/1999 | Vincent | |
| 7,039,808 B1 | 5/2006 | Fausse | |
| 2005/0103839 A1* | 5/2005 | Hewel | 235/380 |
| 2006/0259961 A1* | 11/2006 | Joffray | 726/9 |

FOREIGN PATENT DOCUMENTS

| | | |
|---|---|---|
| EP | 0 763 791 A1 | 3/1997 |
| EP | 1 486 908 A1 | 12/2004 |
| EP | 1 636 736 | 3/2006 |
| GB | 2 355 331 A | 4/2001 |
| WO | WO 95/26085 A1 | 9/1995 |
| WO | WO 00/56007 A1 | 9/2000 |
| WO | WO 2004/111923 | 12/2004 |

OTHER PUBLICATIONS

International Search Report for PCT/EP2008/062311 completed Oct. 30, 2008.
Written Opinion for PCT/EP2008/062311 completed Oct. 30, 2008.

* cited by examiner

*Primary Examiner* — Beemnet Dada
(74) *Attorney, Agent, or Firm* — Buchanan Ingersoll & Rooney PC (57) ABSTRACT

The present invention relates to a method for obtaining a PIN validation signal in a data processing unit, the method including the steps of receiving a PIN in the data processing unit, submitting it to a first portable object for verifying it and obtaining a validation signal. The method further includes the steps of catching or receiving an entered PIN directly in said first portable object for verifying it; transmitting a fake PIN to the data processing unit, the fake PIN being seen by the data processing unit as a PIN to submit to the first portable object for verifying it, and returning a validation signal in case the entered PIN is verified successfully in the first portable object. The invention relates also to corresponding system and secure portable object.

11 Claims, 4 Drawing Sheets

METHOD AND SYSTEM FOR OBTAINING A PIN VALIDATION SIGNAL IN A DATA PROCESSING UNIT

The invention relates to a method and system for obtaining a PIN validation signal in a data processing unit. The system of the present invention includes a secure portable object namely smart-card to carry on the method, and a data entering interface.

The invention is applicable for any operation where a secure PIN verification or more generally any secure data entering is requested namely for accessing to a service provider, to sign, to authorize a transaction. Any kind of operation will be designated thereafter in the present description by transaction.

There are many types of secure operation, which require a secure input of information: a Personal Identification Number (PIN), a validation acknowledgment, a confidential data . . . . This information can be controlled by a smart card or any other secure component, in an unsecured environment constituted by a processing data unit, for example, a personal computer (PC), which can be open or not trustable. However, all the security brought by the smart card may be useless because the PC, as an open system, is not a trustable environment.

For example, Internet offers many use cases where the user has to perform some validation on-line, for instance, when purchasing some goods, or later-on on-line pages (newspaper, database searching . . . ). When validating engages the user's responsibility, some precaution should be taken. In such case, the issue is always how to be sure the data we are validating is really the one supposed to be.

The patent WO00/56007 filed by the applicant on Mar. 17, 2000 consists in verifying a message signature. In said patent, the smart card receives the message and the corresponding certificate from a personal computer (PC), verifies the certificate and transmits to display means at least result information of verification in order to check the certificate. The same principle applies for the message and the signature.

When the user has checked the certificate, the message or the signature, he presses a button or enters a confidential code that is transmitted to the card through the input/output of the card connected to the insecure environment.

Hence, it is possible to modify the housing in which the card is inserted in order to tap the confidential code or data and send it over Internet or to send a false acceptance to the card.

Entering a Personal Identification Number (PIN) might also be required, which when performed through the PC keyboard induces the risk of having it being tapped in said PC.

These concerns have the same origin as the electronic signature issue. A Trojan horse virus may perform some internal changes in the computer that makes you validating a data that is not really the one you think it is, or it might tap the PIN when the user enters it.

The inventor has proposed a solution in patent application no EP1636736 which consists in offering a smart and secure gateway; The smart card is a USB capable smart card (e.g. eGate) and constitutes a closed, secured and controlled environment with at least two inputs/outputs; One comprises USB contacts and is dedicated to send and receive data to and from an insecure environment, another comprises standard ISO 7816-x contacts to address at least a keyboard using the Integrated Chip Connection ($I^2C$) bus standard since ISO 7816-3 and $I^2C$ standards are electrically compatible and is dedicated to send and receive data to and from a secure environment (point of sale, PIN-pad, ATM, private pin pad, secure network) in order to perform operations which require a security control such as validating a transaction, checking a signature, encrypting or decrypting . . .

Nevertheless, this system cannot be easily applied at a great scale since it requires adapting some of the following components. Firstly, the middleware ensuring the Graphic User Interface (GUI) on the PC holding the Universal Serial Bus (USB) host must be adapted to address the invention since the method to verify a PIN does not consist anymore on typing the PIN on the PC keyboard and sending it to the card for verification. In this invention, the entering PIN session was entirely managed by the smart card controlling the $I^2C$ PIN pad. Therefore, the middleware should support both this method to enter a PIN, and the standard method for sending the verification command to the card indicating the PIN to check as an incoming parameter.

Secondly, the smart card "VERIFY" APDU command as described in ISO 7816-4 standard cannot be used as it is and a dedicated APDU shall be added to address the invention. This remark also applies on other PIN management related APDU such as "CHANGE REFERENCE DATA" or RESET RETRY COUNTER.

The purpose of the invention is therefore namely to avoid this two identified drawbacks, making the secure PIN Pad usable in any already existing personal computer environment without any or quite any modification required.

TECHNICAL FIELD

This invention belongs to the field of portable object provided with at least memory means and means able to connect said portable object to at least an object-accepting device with which the portable object is able to work or dialog.

Portable objects comprising integrated circuit like cards also called smart cards are small plastic devices which contain one or more embedded integrated circuits. A card with integrated circuit can be for example a memory card or a microprocessor card called also microprocessor chip-card. A smart-card is accessed with a card reader that may have an aperture or slot or else into which the smart card is inserted.

Data-entering-interface covers every device used to receive or to be connected with a portable object and work with it (read, write, delete, and/or every possible operation). The data-entering-interface can be part or linked with a computer, a PIN-pad, a reader or else . . .

The portable object accepting device or reader or PIN-pad may have the form of a housing provided with an aperture or slot to receive the portable object but also any form allowing the portable object to be connected to the portable object accepting device. In one embodiment the smart object is the PIN-pad itself having on board a secured module or electronic component. In another embodiment, the card itself is the PIN-pad since it comprises as a keyboard.

OBJECT AND SUMMARY

The principle of the invention consists in introducing the PIN directly into the secure portable object and to send a fake PIN to the PC as if it were the real entered PIN. Thus, the PC believes it is receiving the entered PIN and therefore the PIN verifying session may continue as usual since it is not modified in the PC in particular with respect to the APDU Verify Command.

When data processing unit submits fake PIN to the portable object, the secure portable object may then send validation signal if entered PIN is right.

Therefore, one object of the present invention is a method for obtaining a PIN validation signal in a data processing unit, the method comprising the following steps of receiving a PIN in the data processing unit, submitting it to a first portable object for verifying it and obtaining a validation signal;

The method is characterized by the steps of:
- catching or receiving an entered PIN directly in said first portable object for verifying it;
- transmitting a fake PIN to the data processing unit, said fake PIN being seen by the data processing unit as a PIN to submit to said first portable object for verifying it,
- returning a validation signal in case entered PIN is verified successfully in said first portable object and after data processing unit send a fake PIN submission.

According to a particular way to carry on the method, the method comprises a step consisting in comparing in portable object fake PIN submitted by the data processing unit to a previously stored fake PIN and in case it matches, replacing submitted fake PIN by initially caught or received entered PIN for delivering said validation signal.

Another object of the invention is a system for obtaining a PIN validation signal in a data processing unit, said system comprising a data entering interface for entering a PIN, a data processing unit able to receive an entered PIN and to submit it to a first portable object, a first portable object for delivering a validation signal to the data processing unit in case PIN is right, said system being characterized in that it is adapted for:
- catching or receiving said PIN directly for verifying it in the portable object,
- transmitting a fake PIN from the portable object to the data processing unit (3), said fake PIN being seen by the data processing unit as a PIN to submit,
- returning a validation signal in case entered PIN is verified successfully.

According to particular features the system is adapted to compare fake PIN submitted by the data processing unit to a previously stored fake PIN in the first secured object and in case it matches, to replace submitted fake PIN by initially caught or received entered PIN for delivering said validation signal.

Another object of the invention is a secure portable object and a data entering interface comprising it. Said secure portable object is able to deliver a PIN validation signal in response to a PIN submission from an external data processing unit is characterized in that it is adapted for:
- catching or receiving said PIN directly for verifying it,
- transmitting a fake PIN to the data processing unit (3), said fake PIN being seen by the data processing unit as a PIN to submit,
- returning a validation signal in case entered PIN is verified successfully.

According particular features, the secure portable object comprises a first connection means for connecting said data processing unit and a second connection means for connecting said data entering interface to said first portable object, said second connection means being physically separated from said first one and is adapted for being seen by the data processing unit as a device comprising a standard data entering interface.

BRIEF DESCRIPTION OF THE DRAWINGS

Other purposes, features and advantages of the invention will appear on reading the description which follows of the implementation of the method and system according to the invention and of a mode of realization of a portable object designed for this implementation, given as a non-limiting example, and referring to the attached drawings in which.

BEST WAY OF REALIZING THE INVENTION

Figure 1:
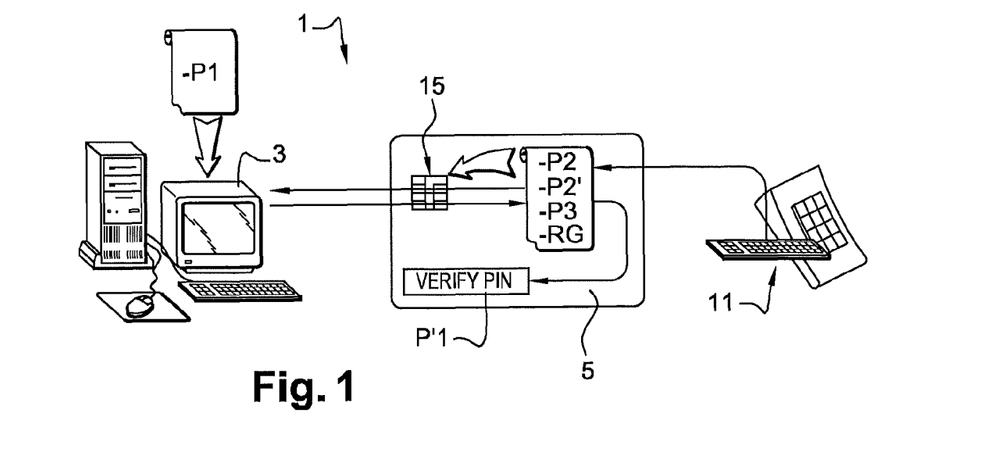
FIG. 1 is a schematic logic diagram of a non-limiting system embodiment according to the present invention.

According to an embodiment of the invention, FIG. 1 shows a logic diagram of a system 1 for obtaining a PIN validation signal in a data processing unit 3. In other use, the PIN may be any data which secrecy must be kept in a secure environment. Therefore the term PIN is used in the description and claims for designating any data.

The system comprises (FIG. 1, 4) a first portable object 5 connected to a data processing unit 3 represented here by a personal computer PC through first connection means 7, 8, input/output I/O1. The PC and the card comprise hardware and/or software, protocol P1 shared or spread in both of them to enable an ISO PIN communication and validation session. The software includes namely set of ISO commands such as the "Verify Command" for receiving an entered PIN in the PC and submitting it to a secure portable object for retrieving said validation signal.

Figure 2:
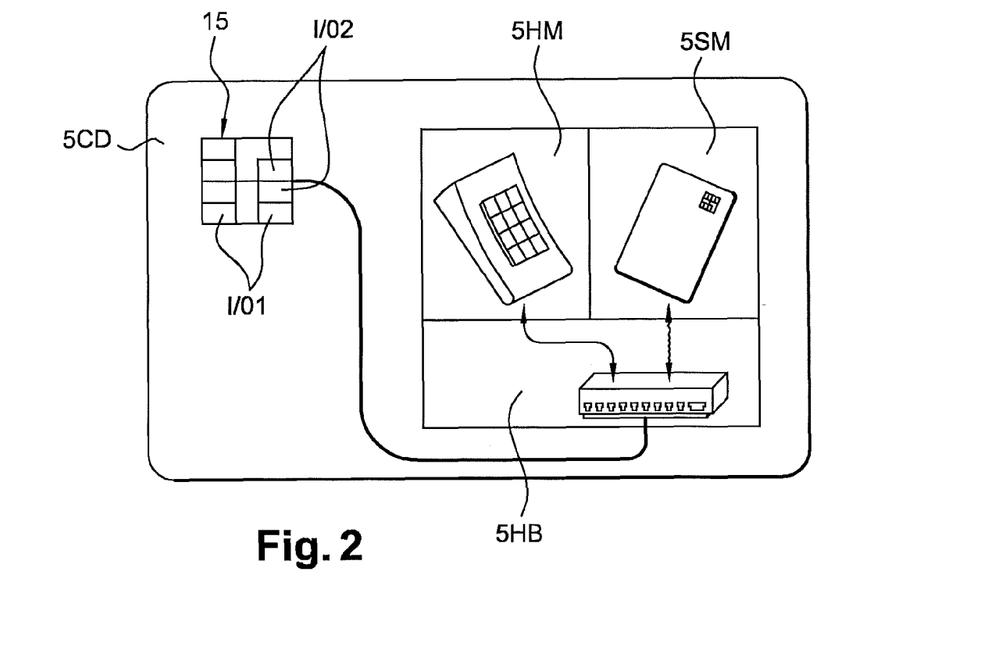
FIG. 2 is a schematic view of an embodiment of a secured portable object such as an electronic unit or module embedded in a smartcard.
Figure 3:
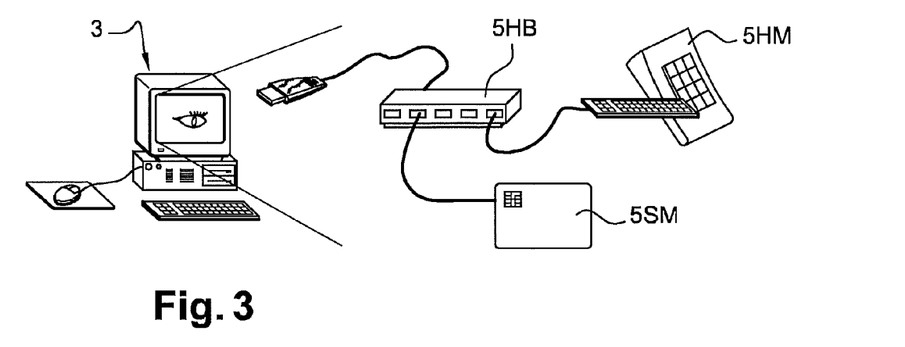
FIG. 3 is part of the system seen from an USB host point of view.

Although other computerized means, such as PDA, mobile phone, might represent such data processing unit, the secured portable object is represented here as a smart card which is described more deeply with respect to namely FIGS. 2, 3.

According to this embodiment, the system comprises (FIGS. 1, 4) a secured data entering interface 11 for entering the PIN. The data entering interface may be a Graphic User Interface (GUI), which may include keyboard, electronic mouse, etc.

Said secured data entering interface (11, 5hm, GUI) is preferably connected directly to the secure portable object 5 through second connection means 13, 15, input/output I/O2. In fact the system includes means in order that data entered by the user is caught directly by the secured portable object excluding the PC or any unsecured environment.

Rather than having two separates input/output on the portable object, there might be a bypass or a derivation with selecting means which sends entered data directly to the portable object, then portable object return fake PIN or data to PC through another or same circuit or path. Using same path, the fake PIN is first returned in data entering interface and is thereafter sent to the PC. The PC therefore believes he received the data from the Keyboard since it comes from the keyboard connection connected to the PC.

For this method, the data entering interface may be connected between the PC and the card in order to be able to catch data entered and select whether to send the data to the card or to the PC.

For implementation, the data entering interface, namely keyboard may have a program or hardware means adapted to sent the data to the card when the data is entered and validated on the keyboard, and sent to the PC a fake data when it is received from the card where it is generated. As an alternative, fake PIN may be generated by keyboard and sent to the PC whilst right PIN is sent from keyboard to portable object. Key on the keyboard may be dedicated to select the path or mode PIN entering.

The portable object like a card may of course be integrated in the keyboard as an independent object or attached as a component.

It is thereafter described that for security purpose in order to maintain a secure environment around the portable object, said second connection means 13, 15, I/O2 are physically separated from said first one 7, 8.

In the particular embodiment of the present invention shown in FIG. 1, 2, 3 the portable object 1 is a smart card with an integrated electronic unit such as a chip component; the electronic unit (not shown) comprises at least a microprocessor CPU with two-way connection via an internal bus to a non volatile memory of type ROM, EEPROM, Flash, storing at least a program to be executed, a volatile memory of type RAM and input/output means to communicate with the exterior. The unit may comprise additional components not shown, connected to the internal bus. The chip integrated in the thickness of the card is connected to a module, which comprises a set of flat connectors 15 on the surface of the card.

The secure portable object may present itself in different form factor namely a USB Key, a dongle, an USB dongle implementing a card reader function. It may also present itself in the form of an electronic secured component fixed on a printed circuit board, or an electronic circuit. The component may be fixed to a data entering user interface, such as a secured keyboard, a PIN-pad, a One-Time-Password (OTP) device, The portable object, like a smart card, may itself carry a keyboard or equivalent means for entering data.

In a variant, the portable object may be adapted for being seen by the data processing unit (3) as comprising a standard data entering interface (5hm).

According to a preferred feature of the example, the smart-card is a USB smart-card 5 which is also a USB compound device 5CD which presents itself as a set of USB devices, to the host 3 to which it is connected (see FIG. 3). The compound device (5CD) integrates at least the following USB devices, a USB hub (5HB), a USB Human Interface Device (HID) (5HM) (i.e.) that is a keyboard here in the example, a USB smart card 5SM (e.g. an eGate).

As it is already known from the USB technology, the USB physical interconnect is a tiered start made of three types of devices:

The USB root that is hold by the PC;
The USB HUB (interconnect). There is at least one HUB in a USB that is the root HUB. There may be up to five level of HUB on the same bus;
The USB functions that are always connected to a HUB. It may be a scanner, a printer, a joystick, a keyboard . . .

According to the USB topology, objects named "Func" are the USB functions (keyboard, printer, scanner . . . )

A compound device is a unique physical device that combines one or more functions with a HUB in a single package. There might be a single chip, of a more complicated electronic device combining several electronic components.

In the USB standard, a real device (i.e. the e-gate card, a printer, a keyboard . . . ) is always coupled with a virtual device that is the device driver allowing the computer application to access to the real device functions In case of a compound device, it is associated with a least two virtual devices (one for the HUB and 1 per function)

According to one embodiment of the invention, the portable object 5 is also adapted, namely through a specific secure software or logical function included (illustrated by reference P2 at FIG. 1 and also by flow-chart at FIG. 5), for catching and in certain cases storing the entered PIN in said first portable object, transmitting a fake PIN to the PC, said fake PIN being seen by the PC as entered PIN;

According to a variant, program P2 may be adapted also for comparing submitted fake PIN from the PC to said stored fake PIN and in case it matches, replacing submitted fake PIN by initially entered PIN for delivering said validation signal.

In the example, from logic and electric aspects, the card is not directly connected to the PC through the PIN-pad. It is the PIN-pad which is connected to the PC through the card. The card is initially connected to the PC and powered, and then researches the presence of a PIN-pad on I/O2 while proceeding to an enumeration of I²C bus. Thereafter, the card can determine if the peripheral which is attached to her includes a screen or not.

The smart-card comprises preferably secured means as described in patent EP1636736 to separate an insecure environment that is a PC (with which it communicates using a USB interface) to a secure environment that is a smartcard dedicated low-cost PIN-pad (with which it communicates using an I²C interface).

Above secure means are shown in FIG. 2, where the portable object 5 constitutes a secured and controlled environment with at least two input/outputs (I/O1, I/O2). The insecure input/output I/O1 is dedicated to support the exchanges with an insecure or uncontrolled environment (i. e. an environment on which the user cannot rely without restriction such as a PC or a POS device). The secure input/output I/O2 is connected to environment (s) on which the user relies (e. g. a personal PIN pad). Therefore, all the information needed to perform the secure operation from the user is transmitted to the portable object through the secure input/output I²C.

Thanks to this construction, the user, aware to not use the insecure environment, would connect a secure keyboard (5HM, 11, PIN-pad), to the secure I/O2 to send the confidential data. If this datum is a PIN, he would connect dedicated keyboard to the secure I/O2.

The term "connected" means namely that the connected devices are linked in such a way that they can transmit information with each other. The devices can be connected through many types of connections (wires, radio, Bluetooth, NFC . . . ).

Figure 4:
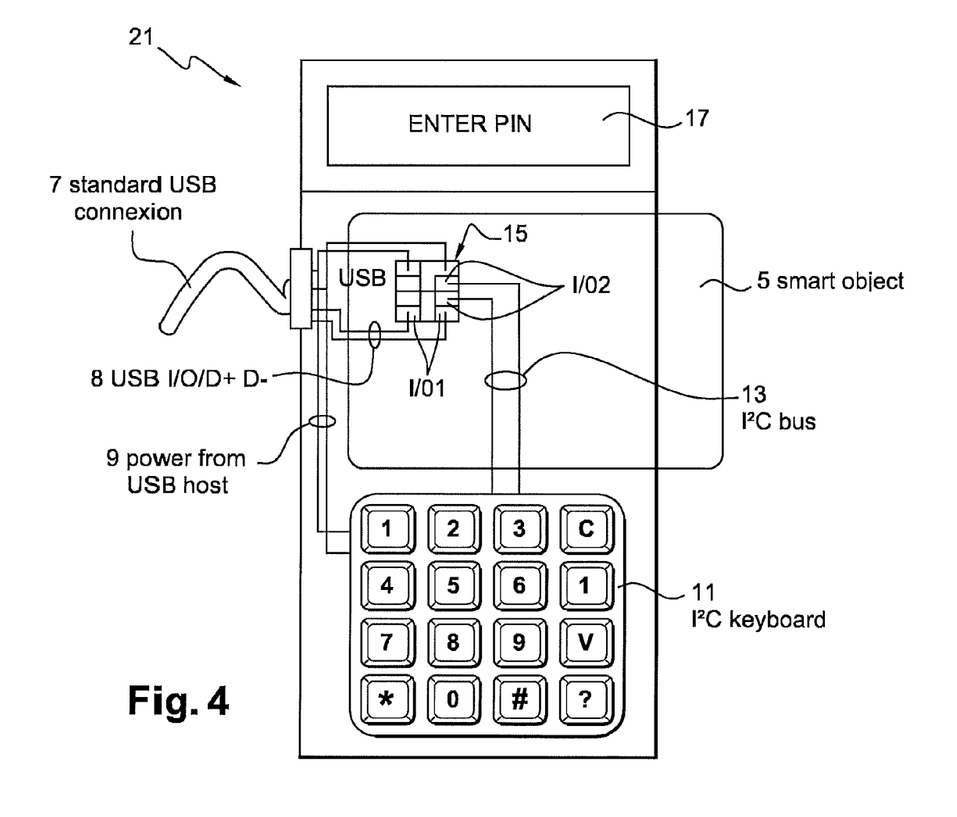
FIG. 4 is a schematic view of an embodiment of a PIN-pad including the secure object.

As shown in FIG. 4, the data entering interface or device, as a low cost PIN-pad, comprises the portable object 5 such smart-card inserted in it. The secure environment is made of the I²C bus 13 and low cost I²C keyboard 11, while the insecure environment is made of the USB input/output (I/O1), connection 8 from contact pads 15 to USB standard connection 7 and the PC (USB host) 3 to which the smart-card 5 is connected.

Keyboard 11 is a powered from power supplied by host through standard connection 7 and supply lines 9 from contact pads 15 connected in turn to the host through connection 7. A display 17 is preferably available to display PC instructions, or message such as "enter PIN, ERROR".

According to an embodiment, the portable object may be included in the data-entering-interface as an electronic component fixed thereon.

As illustrated on FIG. 3, from the PC standpoint, the low cost I²C keyboard 11 is viewed as "standard" keyboard 5HM that is an input device for the PC for entering information.

In order to send a fake data, namely a fake PIN, the smart object, in the example, is preferably adapted namely by comprising logical transformation function F3 or specific secured transformation program P3 in order to replace each I²C keyboard key pressure by a random number generated in the smart card that is transformed into a keyboard acceptable key value sent to the USB host (i.e. the PC).

The smart-card is also adapted in such a way, namely through another application program or logical function P2 that when a key is pressed on the PIN-pad (low cost I²C keyboard 11), the smart card is able to detect it or catch it, namely by using I²C protocol and preferably to memorize its value.

The card may comprise and/or activate a random generator/random function (RG) to generate a random digit. Then through a transformation application program P3 or logical function F3, the character associated to the key is replaced by the card by a randomly generated digit which is sent to the PC. Accordingly, the entire PIN entering session may be handled using the same principle.

As an alternative, previously stored digit or PIN(s) might be used instead of randomly generated digit(s). PIN-pad keyboard may have a mode selection means to pass from secure mode to non-secure mode. In the example, the secure state mode may be used to type a PIN although none secure one may be used to enter an amount. The card could then light a LED on the PIN-pad to indicate the state mode. According to the current state mode chosen by the user, the card replaces the entered digits by fake ones (secure mode) or send the real digit entered to the processing unit (not secure mode).

The transformation program or logical function P3 is going to be more explained in detail thereafter; It may be preferably adapted to only replace a digit from 0 to 9 by an unpredictable randomly generated other digit. The result of the transformation is preferably also a numerical digit to avoid conflict on the PC when it is in a PIN entering sequence or session. It may also preferably be adapted in such a way that when the user presses a key that is not a value, namely from 0-9, but that is dedicated to manage data edition (e.g. backspace, cancel, valid . . . ), same key value is sent to the PC.

To generalize the principle, if the CHV (card holder verification value) is made of numerical digit, the result of the transformation should also be numerical digits, and if it is made of alphabetic characters, the result of the transformation should also be alphabetic, etc.

Each key value sent to the PC has no relation with the key pressure on the I²C keyboard, except in a smart-card memory where for some cases the association between the digits entering and the random number generated is made. At least the Validation and backspace keys shall be transmitted as such to the USB host. Thus, the PC data entering sequence can be validated or corrected. These latter values may be transmitted alternatively through an additional standard keyboard connected to the PC in a normal way rather than through the secured data entering interface.

As the PIN entered on the keyboard driven by the card is never send in clear to the PC, it is always secured and at the end of the operation, the user validates, or cancels, the PIN by pressing a dedicated key. These keys are not changed by the card and the PC receives same values.

The card holder shall use in priority the secure I²C keyboard to enter its PIN value. The standard PC middleware software gets the key pressed data as it comes from the I²C keyboard, exactly as it does it using the PC 'large' main keyboard. The PC has no idea this keyboard is an I²C device as it see it as a USB HID.

The PC software P1 is able, when the PIN entering sequence is validated (i.e. terminated), to sends the data for verification to the smart card (e.g. using the standard ISO 7816-4 'VERIFY' APDU command).

According to another way to implement the transformation program P3, rather than replacing each value one per one after their entering, the total PIN code may be replaced when all are entered and confirmation done.

The specific secured program or logical function is adapted in such a way that when the card receives the PIN to check through the VERIFY command, the ISO procedure in the card P1' (which may be part of programs P2, P2' as included) may be preferably delayed by at least a test step 400 in which the incoming digit are compared with the fake ones or generated ones.

If the fake value matches, following the specific secured PIN program P2, in the smart card, this fake incoming data is replaced with correct PIN value entered by the card owner, and the card continues the ISO PIN verification procedure P1 normally by verifying it and sending a validation signal to the PC.

If fake PIN does not match to stored one, the smart card considers the I²C keyboard was not used to enter the data to verify, and then the incoming data are verified directly as explained later with respect to FIG. 6.

The card verifies the PIN was validated on keyboard. Assuming the PIN value is correct, the card continues the transaction. Otherwise, it is cancelled.

Detailed Description of a Practical Implementation of the Method

Figure 5:
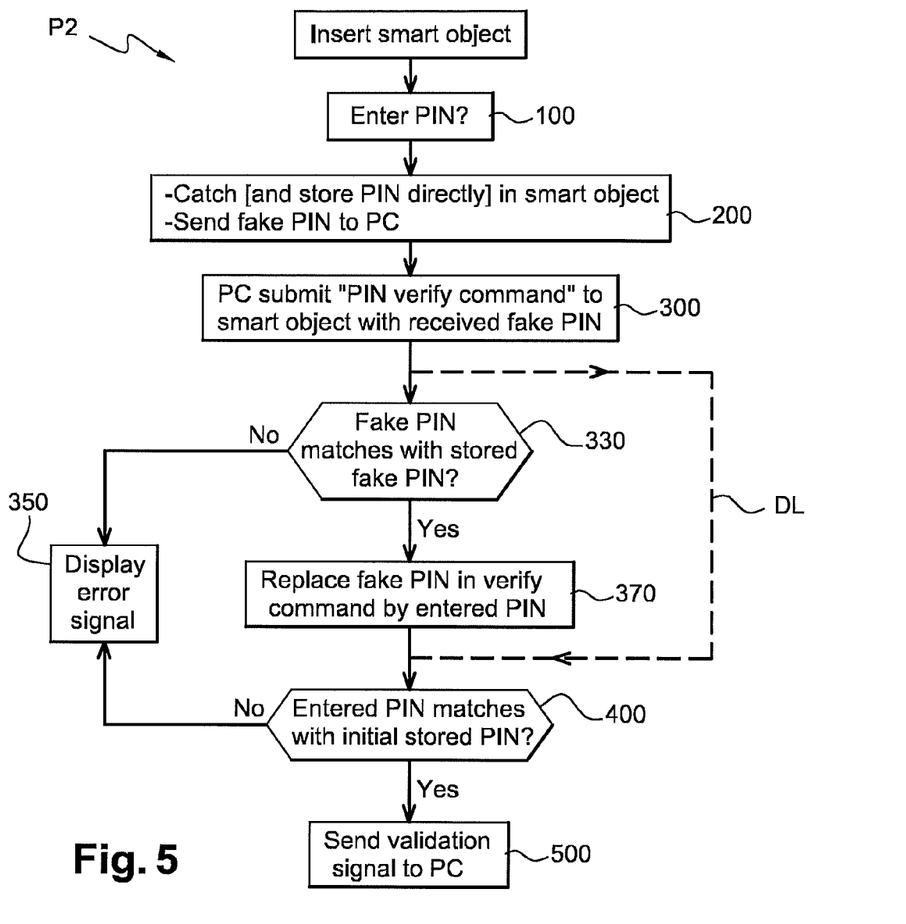
FIG. 5 represents a flow-chart illustrating main steps of a method according to a particular way to carry it on and/or corresponding to main steps of a specific program of the secure object for implementing the method.
Figure 6:
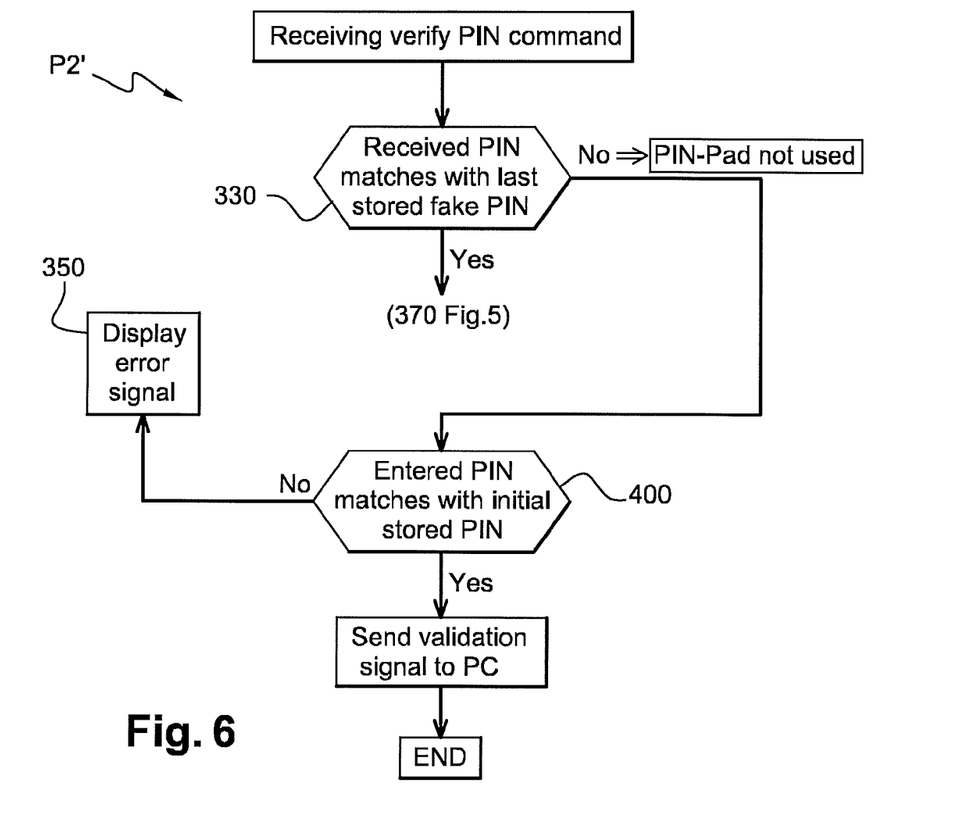
FIG. 6 represents a program flow-chart illustrating alternative way to carry on the method.

The method of the invention is described thereafter with respect to flow-charts of FIG. 5 or 6. These flow-charts illustrated also main steps of a specific secure program loaded in an EEPROM or preferably stored in a ROM of the secure object.

A user has a payment card. He uses it to buy goods or services on the Internet from home using its PC. The card is directly connected to a USB (Universal Serial Bus) PC host through a card accepting device 21 only made of electronic wires. It is compatible with USB standard, and recognized by the PC.

The smart-card application requires a PIN to be presented for payment. In order to avoid the user to type its PIN on the PC keyboard, a second set of connectors is dedicated for the connection with the PIN-pad 21 equipped with the adequate keyboard 11 and display 17.

The PC is an insecure environment because a virus could perform unwanted actions that the user does not see, including addressing a smart card.

The user, willing to perform a transaction over the Internet, here purchasing goods or services, connects its computer to the merchant site. Having chosen the goods or services he wants, the user checks out the Internet site for payment.

The PC enters in a payment session, and receives the essential transaction data (price, goods/services list, article references, banking establishment name . . . ) from the Internet site. They are displayed on its screen, asking the user to confirm the payment session.

The user confirms or cancels the transaction by pressing a key on its personal PIN-pad. The key press is relayed to the PC by the smart card that receives it from the secure I/O2 and sends it through the insecure I/O1. This allows verifying the personal PIN-pad works correctly.

In the course of its transaction, the user is invited to introduce his payment card on his reader. The user introduces his card in its personal PIN-pad, then, a first communication channel is established between the card and the PC through the card insecure input/output I/O1 (contact pads 15) and a second communication channel flows through the secure card I/O2. The PC powers the personal PIN pad through the card that relays VCC and GND connectors to the PIN-pad side through power supply lines 9.

According to a way to carry on the method, a USB device recognition procedure starts when the card and the I²C keyboard are connected to the PC. The PC detects two USB devices, a smart card and a keyboard 3 that is the I²C keyboard driven by the smart-card.

From the PC standpoint, the keyboard is usable like another keyboard. The PC has no idea that the keyboard is in reality driven by the smart card.

Then at step 100, to complete the transaction, the PC asks the user to enter its PIN through message "ENTER PIN" following the ISO procedure in order to receive an entered PIN in the PC and submitting it to a secure portable object for retrieving said validation signal; a message "Enter PIN" is displayed on PC monitor or on PIN-pad display if available (this latter option requires the PC to previously know how to address the display on the PIN-pad).

Then the user enters the PIN through its secured PIN-pad, the secure I/O2, in order to prevent the tapping of the insecure I/O1 that is connected to the insecure environment.

Subsequently, at step 200, the entered PIN values are caught and preferably stored in smart-card as first portable object and according to the one embodiment of the invention; a fake PIN is transmitted to the PC. Preferably, each time the user presses numeric key, the card stores its value in its memory, and sends a fake PIN numeric value to the PC, which in turn, may display a '*' (star character). But the transmission of PIN values can be done after all values have been entered. A dedicated key pressed on PIN-pad may be used to indicate the beginning of PIN entering session avoiding therefore sending to the PC their right value, the PIN being sent to the PC as soon as the validation key is pressed.

Said fake PIN is seen by the PC as the entered PIN, then the smart card and the PC enter in a PIN entering session according to the ISO procedure. Therefore, at step 300, the fake PIN is then submitted to the smart card as a secure portable object by the PC through the ISO APDU command "VERIFY PIN".

At test step 330, then, fake PIN is compared to one stored previously in smart card and in case it matches, (test successful) then the program turn to step 370 where the card replaces submitted fake PIN by initially entered PIN to continue the ISO PIN session. Different ways to replace fake PIN by entered PIN are possible.

At test step 400, if entered PIN matches with PIN stored at personalization step, then the program goes to step 500 and causes the smart-card to deliver a validation signal (V) to the PC.

At step 350, an error message is returned by the card to the PC which displays it to the user on PC monitor, in case fake PIN does not match at step 330 or in case at test step 400 entered PIN does not match with initial stored PIN at smart-card personalization.

In another version or way to implement the method, steps 330 and 370 may not be used enabling therefore the method to go directly from step 300 to step 400 (through line DL). That means, for example, that on receipt of fake-PIN Verify Command, the validation signal V is returned to the PC by the card only if step 400 has been realized before successfully in the card, without taking in account fake PIN value as previously.

The step 400 might be done previous to step 300 namely just after step 100 and the validation signal been prepared previously in advanced before verify command is received from the PC at step 300. It is also possible to return the validation signal without take care of the reception in portable object of verifying command with fake PIN from the PC, namely after an adjusted timing.

As another way to carry on the method, the application program in the portable object may be provided other steps illustrated at FIG. 5 with dotted line DL.

According to this new way, at step 330 if received PIN does match with last stored fake PIN, the card understand the secure PIN pad was not used and the program goes directly to the test 400 as usual to execute the APDU verify PIN command.

If test 400 is not successful, an error message is sent namely to the PC at step 350. In the contrary, the card sends the validation signal to the PC, and terminating the program.

The invention claimed is:

1. A method for obtaining a PIN validation signal in a data processing unit, the method comprising:
   receiving, in a portable object, a PIN directly from a data entering interface such that said PIN can be verified;
   verifying, in the portable object, the received PIN;
   replacing, in the portable object, the received PIN with a fake PIN;
   storing, in the portable object, said fake PIN;
   transmitting said fake PIN, upon verification of said received PIN, from the portable object to the data processing unit, said data processing unit viewing said fake PIN as a PIN having been received by said data entering interface and still requiring verification by said portable object;
   transmitting the fake PIN from the data processing unit, to the portable object for verification;
   comparing, in said portable object, said fake PIN received from the data processing unit with the fake PIN stored in the portable object; and
   when a result of the comparing indicates that said fake PIN received from the data processing unit corresponds to the fake PIN stored in the portable object, returning a validation signal, from the portable object, to the data processing unit.

2. The method according to claim 1, wherein if the received fake PIN corresponds to the stored fake PIN, replacing the received fake PIN by the PIN initially received from said data entering interface for delivering said validation signal.

3. A system for obtaining a PIN validation signal in a data processing unit, said system comprising:
   a data processing unit;
   a data entering interface for entering a PIN; and
   a portable object that (i) directly receives the entered PIN, (ii) verifies the entered PIN, (iii) replaces the entered PIN with a fake PIN, (iv) stores the fake PIN, and (v) transmits the fake PIN to the data processing unit, said data processing unit viewing said fake PIN as a PIN entered by said data entering interface and still requiring verification, wherein
   upon receiving said fake PIN from said data processing unit for verification, said portable object (i) compares the fake PIN received from the data processing unit with the fake PIN stored therein and (ii) returns a validation signal to said data processing unit when a result of the comparison indicates that said fake PIN received from the data processing unit corresponds to the fake PIN stored therein.

4. The system according to claim 3, wherein if the received fake PIN corresponds to the stored fake PIN, said portable object is configured to replace the received fake PIN by the PIN initially entered by the data entering interface for delivering said validation signal to said data processing unit.

5. The system according to claim 3, wherein the data entering interface comprises a keyboard.

6. The system according to claim 3, wherein said portable object comprises:
- a first connection for connecting said data processing unit to said portable object; and
- a second connection for connecting said data entering interface to said portable object, wherein said second connection is physically separated from said first connection and is configured to be recognized by the data processing unit as a device comprising a standard data entering interface.

7. A secure portable object configured to deliver a PIN validation signal in response to a PIN submission from an external data processing unit, said object comprising:
- a means for receiving a PIN directly from a data entering interface for verifying the entered PIN;
- a means for replacing the received PIN with a fake PIN;
- a means for storing said fake PIN;
- a means for transmitting said fake PIN to the data processing unit, said fake PIN being seen by the data processing unit as a PIN received from the data entering interface and still requiring verification; and
- a means for returning a validation signal to said external data processing unit (i) upon receiving the fake PIN from said external data processing unit for verification and comparing said fake PIN received from said external data processing unit with the stored fake PIN, and (ii) when a result of the comparison indicates that said fake PIN received from the external data processing unit corresponds to the stored fake PIN.

8. A secure portable object according to claim 7, wherein if the received fake PIN corresponds to the stored fake PIN, the object is configured to replace the fake PIN with the PIN initially entered by said data entering interface.

9. The secure portable object according to claim 7 wherein,
- said means for transmitting a fake PIN to the data processing unit and for returning a validation signal to said data processing unit includes a first connection for connecting said data processing unit to said secure portable object, and
- said means for receiving the PIN from the data entering interface includes a second connection for connecting said data entering interface to said secure portable object, said second connection being physically separated from said first connection and configured to be recognized by the data processing unit as a device comprising a standard data entering interface.

10. The secure portable object according to claim 7, wherein the data entering interface comprises said secure portable object.

11. The secure portable object according to claim 7, wherein said secure portable object an attached electronic component of the data entering interface.

* * * * *